United States Patent

[11] 3,593,332

[72] Inventors Gerald K. Strehl
Pontiac;
Walter J. Fitzgibbons, Southfield, both of, Mich.
[21] Appl. No. 824,117
[22] Filed May 13, 1969
[45] Patented July 13, 1971
[73] Assignee Information Data Systems, Incorporated
Detroit, Mich.

[54] MAGNETIC DISC MEMORY STORAGE UNIT
6 Claims, 4 Drawing Figs.

[52] U.S. Cl. .......... 340/174.1
[51] Int. Cl. .......... G11b 5/10, G11b 5/60
[50] Field of Search .......... 340/174.1 C, 174.1 E, 174.1 F; 179/100.2 P

[56] References Cited
UNITED STATES PATENTS

| | | | |
|---|---|---|---|
| 3,131,395 | 4/1964 | Lekas | 340/174.1 |
| 3,135,949 | 6/1964 | Whyte | 340/174.1 |
| 3,174,152 | 3/1965 | Maclay | 340/174.1 |
| 3,177,493 | 4/1965 | Burlofsky | 340/174.1 |
| 3,196,422 | 7/1965 | Cheney | 340/174.1 |
| 3,248,737 | 4/1966 | Thomas, Jr. et al. | 340/174.1 |
| 3,371,329 | 2/1968 | Adler et al. | 340/174.1 |

*Primary Examiner*—James W. Moffitt
*Assistant Examiner*—Vincent P. Canney
*Attorney*—Cullen, Sloman and Cantor

ABSTRACT: A memory storage unit having a magnetic-type memory disc mounted upon a rotatable shaft, a recording-receiving head mounted near a face of the disc, with the shaft being axially shiftable during rotation to move and hold the disc to a predetermined position extremely close to the head.

PATENTED JUL 1 3 1971

3,593,332

INVENTORS
GERALD K. STREHL
WALTER J. FITZGIBBONS
BY Cullen, Sloman, & Cantor
ATTORNEYS

MAGNETIC DISC MEMORY STORAGE UNIT

BACKGROUND OF INVENTION

One form of memory unit used in connection with computers has been a magnetizable disc upon which bits of information are stored. Essentially, such units have consisted of a plastic or metal disc treated upon its surfaces so that it can be magnetized to receive and store information, with the disc being mounted upon a rotatable shaft. A magnetic-type recording-receiving head is mounted adjacent the face of the disc for magnetically transmitting information to and removing information from the disc.

In order to maintain accuracy of recording and transcribing and particularly in order to increase the number of recordable bits of information upon the disc, it is necessary to arrange the disc face close to the face of the recording head, preferably in the order of 0.00004 to 0.0002 inches.

Hence, efforts have been made in the past to provide head mounting means which permit the heads to be moved closely adjacent the disc face. These normally have been expensive and relatively complicated and moreover, are not entirely satisfactory in maintaining the very close spacings desired.

Thus, currently available units, with movable heads and fixed position discs have had to adopt a relatively expensive and unreliable head moving mechanism to accomplish close spacings.

Thus, this invention has as its object a means for positioning the disc, during rotation thereof, extremely close to the heads to thereby increase efficiency of the unit, to increase its information storage capacity, to reduce cost and to increase reliability.

SUMMARY OF INVENTION

Summarizing, the invention herein contemplates mounting the recording head or heads in a relatively fixed plane and moving the magnetic disc closely adjacent to the head during rotation of the disc, by means of mounting the disc upon a longitudinally shiftable motor shaft. Means are provided for moving the shaft, during rotation thereof, for positioning the disc within 0.00004 to 0.0002 inches distance from the recording heads.

The unit herein includes an electric motor having an output shaft upon which the disc is mounted for rotation with the shaft and one or more recording heads relatively fixed in position near the face of the disc at a distance greater than normally desired for recording and transcribing so as to insure no contact when starting or stopping. The unit includes a solenoid for longitudinally shifting the shaft so as to place the disc closely adjacent to the recording head during rotation of the shaft. In addition, the longitudinal magnetic centers of the armature, mounted upon the shaft, and the field windings surrounding the shaft, are normally offset longitudinally, so that upon rotation of the shaft, they naturally tend to align causing the shaft to shift longitudinally for holding the disc in the predetermined recording position.

These and other objects and advantages of this invention will become apparent upon reading the following description, of which the attached drawings form a part.

DETAILED DISCLOSURE

Figure 1:
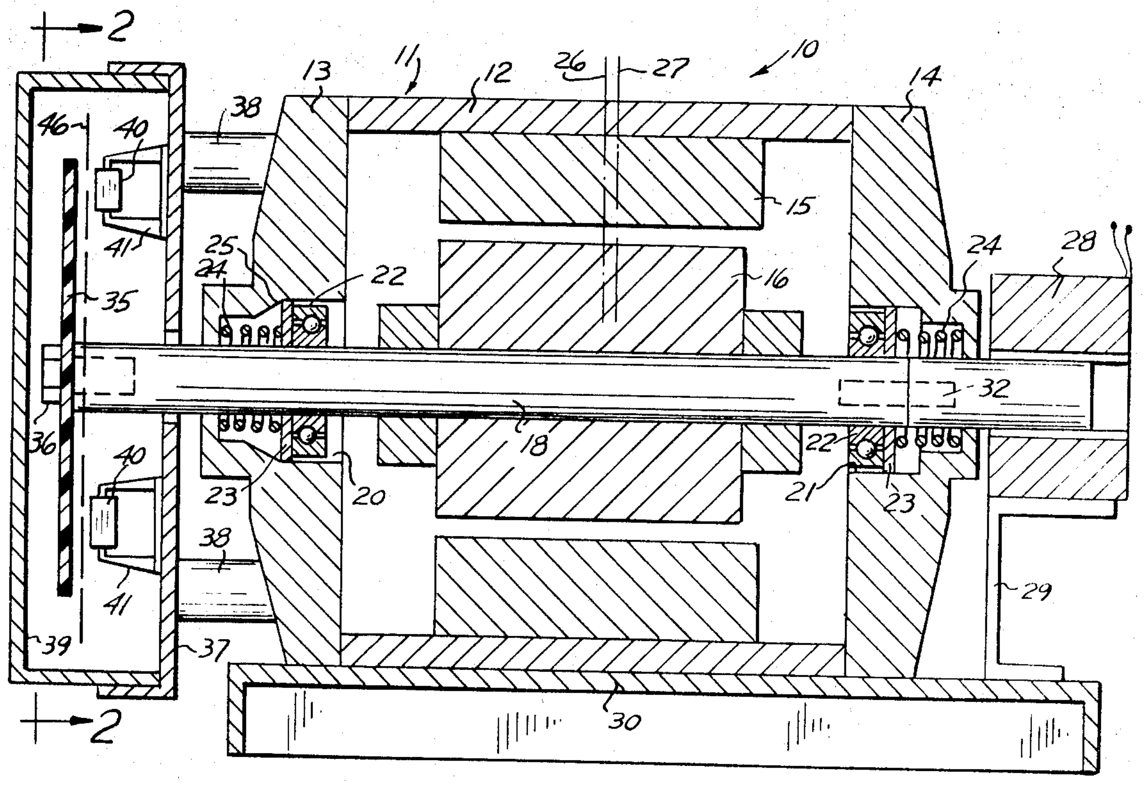
FIG. 1 is a cross-sectional, elevational view of the memory storage unit.
Figure 2:
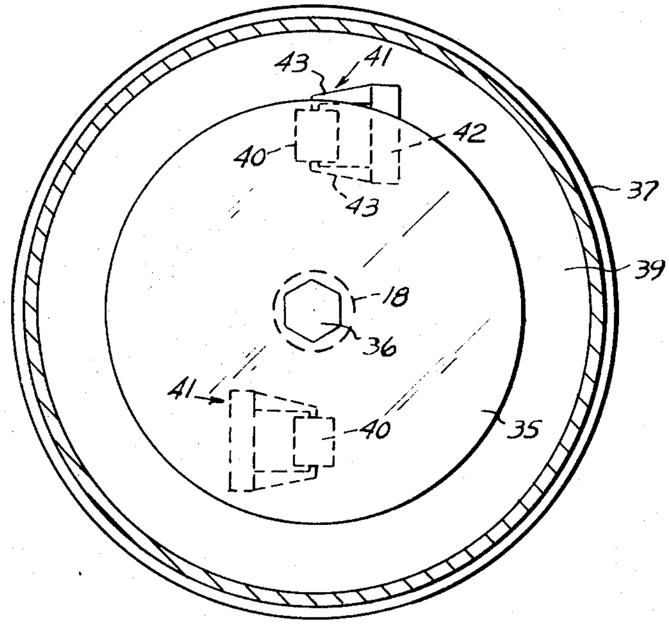
FIG. 2 is a cross-sectional view taken in the direction of arrows 2–2 of FIG. 1.

As illustrated in FIG. 1, the memory unit 10 includes an electric motor 11 having a housing 12 with end caps 13 and 14 secured thereto. The field windings 15 (shown schematically surround the rotor 16 (shown schematically) mounted upon the motor shaft 18.

The opposite ends of the motor shaft extend through an opening 20 in end cap 13 and an opening 21 formed in end cap 14. Mounted within the openings are bearings 22, such as typical ball bearings or other conventional bearings which surround and support the shaft 18. These bearings are loosely fitted within their respective openings so that they can slip or slide longitudinally of their respective openings. FIG. 1 exaggerates the loose fit, for illustration purposes.

Each bearing is backed by a washer 23 and a coil spring 24 seated within the respective end caps for balancing the axial location of the shaft and preloading the bearings. From the foregoing and the illustrated arrangement of the bearings 22 with a radial clearance between the outer race of each bearing and its respective end cap opening 20, 21, it will be apparent, of course, that washers 23 and springs 24 exert axial preloading forces on the outer races of the respective bearings with the inner races being axially fixed on shaft 18.

One washer 23 seats against a shoulder 25 formed within the opening 20 of end cap 13 for limiting movement of the shaft towards the left, as shown in the drawing, and for transmitting spring force to bearing 22.

The longitudinal or axial magnetic center line 26 of the armature 16 is normally offset relative to the longitudinal magnetic center line 27 of the field windings. This may be maintained by the balancing of the spring pressures of the springs 24 when the motor is inoperative.

An electrical solenoid coil 28 is arranged at one end of the shaft 18 and is mounted by means of a suitable bracket 29 upon the base plate 30 upon which the motor housing is also mounted. A solenoid rod 31 extends into the coil and has one end connected to the shaft 18 by means of a suitable key connection 32 or other conventional connecting means, so that the shaft 18 and the rod 31 are in axial alignment. Energization of the coil causes the rod to move toward the right, as shown in FIG. 1, to thereby shift the shaft 18 in the same direction.

Mounted upon the opposite end of the shaft 18 is a conventional magnetizable memory disc 35, typically formed of thin sheet aluminum or plastic which is relatively rigid and whose surfaces are treated with a magnetizable material. Such discs are conventional and readily available upon the market and therefore no further description thereof is given here.

The disc is fastened by means of a bolt 36 or other conventional mechanical connecting means to the end of the shaft and is located within a disc housing formed of a flanged plate 37 fastened to bosses 38 mounted upon end cap 13. A removable cover 39 completes the housing to thereby enclose the disc and keep it dust-free.

Figure 3:
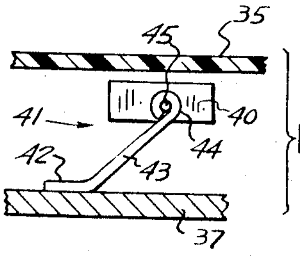
FIG. 3 is an enlarged, plan view of the recording head mounting means.
Figure 4:
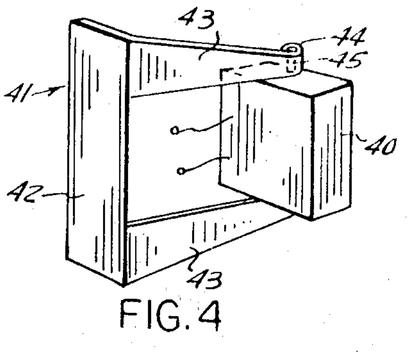
FIG. 4 is an enlarged perspective view of the recording head mounting means.

Conventional magnetic recording-reading heads 40 are mounted within the disc housing and upon the plate 37 by means of springs 41. Such springs consist of a base 42 (see FIGS. 3 and 4) with spring legs 43 straddling the upper and lower faces of the heads 40. The free ends of the legs are bent at 44 to form bearings enclosing studs 45 extending upwardly and downwardly from the respective faces of the heads so that the heads may pivot slightly relative to the springs.

With this type of mounting, the heads can deflect the springs when an air bearing is generated between the disc and heads. Thus the heads are movable towards and away from the discs but for all practical purposes they are arranged in a single plane which is perpendicular to the shaft 18. At this point, when the unit is inoperative, the spacing between the heads and the disc is considerably greater than that required for normal recording and playback and there is no air bearing.

OPERATION

In operation, the motor is energized so that its shaft operates at a constant r.p.m. and at relatively high speed. By energizing the solenoid 28, the shaft shifts to the right as illustrated by dotted line 46 in FIG. 1, thereby developing an air bearing between the heads and disc which in turn causes the heads to deflect their springs. The resulting spacing between the disc and head may be on the order of 0.00004 to 0.0002 inches. In effect, the disc and the heads are separated by an air bearing and the heads, being spring mounted, tend to closely follow the desired spacing by spring movement, thereby compensating for slight shaft or disc-runouts surface irregularities and temperature effects.

At the same time, while the shaft 18 is rotating, the longitudinal magnetic centers of the field windings and the armature windings tend to align, that is, the dotted lines 26 and 27 tend to coincide, thereby also providing a shifting force upon the shaft as well as a force for maintaining the shaft in its predetermined position of maintaining the spacing between the disc and the heads.

In the foregoing description, the heads have been described generally since these are commercially available units and their mounting means are also rather generally described since variations of these mountings are readily available and may be used for various mounting and head movement requirements. However, basically, the unit herein moves the disc to the heads rather than vice versa to thereby establish the close spacing between the heads and the disc.

By means of maintaining the close spacing which is substantially uniform at all times, it is possible to increase the number of bits of recording upon the disc thereby increasing its memory storage capacity.

Having fully described an operative embodiment of this invention, We claim:

1. A magnetic disc memory storage unit for computers and the like comprising an electric motor having frame means and a rotatable armature shaft journaled in said frame means by a pair of bearings each of which includes an inner race mounted on said shaft, an outer race mounted on said frame means and rolling bearing elements operatively engaging between the inner and outer races, one of said races in each of said bearings being mounted for limited axial movement relative to the part upon which it is mounted, said unit further comprising a magnetic-type information storage disc fixedly mounted upon one end of said shaft outboard of one of said bearings with a radial face of said disc disposed in a first plane perpendicular to the rotational axis of said shaft so that said disc and said shaft rotate together, at least one magnetic-type recording-reading head mounted radially outwardly of said shaft in a plane parallel to but normally, when the disc is not rotating, spaced from said disc face along a direction axially of said shaft a distance greater than that required for magnetically reading and recording, means for axially shifting said shaft, while it is rotating, a predetermined distance to move said disc face toward said head and space said head and said disc face closely adjacent one another at the distance required for magnetically reading and recording information from and to said disc via said head.

2. The memory storage unit set forth in claim 1 wherein said one race is said outer race, the inner race of each bearing is axially fixed to said shaft, and wherein said unit further comprises respective spring means associated with each bearing and operatively engaged between the frame means and a respective outer race to locate said shaft axially of said frame means and preload said bearings while permitting limited axial shifting of said shaft.

3. The memory storage unit set forth in claim 1 wherein an armature is mounted on said shaft in a position slightly out of longitudinal equilibrium relative to a motor field developed by field windings on said frame, and wherein upon energization of said field windings and rotation of said shaft the armature tends to move a short distance axially into equilibrium position relative to the field thereby axially shifting said shaft to bring said disc adjacent to said head.

4. The memory storage unit set forth in claim 1 wherein said means for axially shifting said shaft comprises a solenoid coil and a solenoid core, and wherein said core is an integral extension of said shaft.

5. A magnetic disc memory storage unit for computers and the like comprising an electric motor having frame means, an armature shaft and means mounting said shaft for rotation on said frame means and for slight axial movement relative to said frame means, said unit further comprising a magnetic-type information storage disc fixedly mounted upon one end of said shaft outboard of one of said bearings with a radial face of said disc disposed in a first plane perpendicular to the rotational axis of said shaft so that said disc and said shaft rotate together, at least one magnetic-type recording-reading head mounted radially outwardly of said shaft in a plane parallel to but normally, when the disc is not rotating, spaced from said disc face along a direction axially of said shaft a distance greater than that required for magnetically reading and recording, electromagnetic means for axially shifting said shaft, while it is rotating, a predetermined distance to move said disc face toward said head and space said head and said disc face closely adjacent one another at the distance required for magnetically reading and recording information from and to said disc via said head.

6. The memory storage unit set forth in claim 5 wherein said electromagnetic means comprises a solenoid coil and a solenoid core and wherein said core is an integral extension of said shaft at the other end thereof.